US010974356B2

(12) United States Patent
Terada

(10) Patent No.: US 10,974,356 B2
(45) Date of Patent: Apr. 13, 2021

(54) CUTTING APPARATUS

(71) Applicant: DISCO CORPORATION, Tokyo (JP)

(72) Inventor: Kazuki Terada, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 172 days.

(21) Appl. No.: 16/514,506

(22) Filed: Jul. 17, 2019

(65) Prior Publication Data

US 2020/0030928 A1 Jan. 30, 2020

(30) Foreign Application Priority Data

Jul. 26, 2018 (JP) ............................. JP2018-140630

(51) Int. Cl.
*B23Q 3/157* (2006.01)
*B28D 5/00* (2006.01)
(Continued)

(52) U.S. Cl.
CPC ....... *B23Q 3/1554* (2013.01); *B23Q 17/0904* (2013.01); *B28D 5/0064* (2013.01);
(Continued)

(58) Field of Classification Search
CPC ............... Y10T 483/12; Y10T 483/123; Y10T 483/127; Y10T 483/13; Y10T 483/136; Y10T 483/138; Y10T 483/14; Y10T 483/15; Y10T 483/1733; Y10T 483/1736; Y10T 483/174; Y10T 483/1748;
(Continued)

(56) References Cited

U.S. PATENT DOCUMENTS 5,778,751 A * 7/1998 Tsuchishima .......... B23D 61/10
125/15
6,030,326 A * 2/2000 Azuma ..................... B27B 5/32
483/31
(Continued)

FOREIGN PATENT DOCUMENTS

JP 06326186 A 11/1994
JP 2007208114 A 8/2007

OTHER PUBLICATIONS

EPO Machine Translation of JP2007208114A—Sekiya, Kazuma, "Cutting Device", Aug. 16, 2007.*

*Primary Examiner* — Erica E Cadugan
*Assistant Examiner* — Michael Vitale
(74) *Attorney, Agent, or Firm* — Greer Burns & Crain Ltd.

(57) ABSTRACT

A cutting apparatus includes a blade changing unit demounting an old cutting blade from a blade mount and mounting a new cutting blade to the blade mount. The blade changing unit includes a blade holder for holding a support base of each cutting blade and a moving portion for moving the blade holder in the axial direction of a boss portion of the blade mount in the condition where each cutting blade is held by the blade holder, thereby mounting the new cutting blade to the boss portion or demounting the old cutting blade from the boss portion. The cutting apparatus further includes a control unit controlling the blade changing unit. The control unit measures a signal indicating a force applied to the moving portion in mounting or demounting, and determines the condition of the blade changing unit and blade mount according to the signal measured by the measuring portion.

5 Claims, 8 Drawing Sheets

(51) Int. Cl.
  *B23Q 17/09* (2006.01)
  *B23Q 3/155* (2006.01)
  *B28D 5/02* (2006.01)

(52) U.S. Cl.
  CPC .............. *B23Q 3/15766* (2013.01); *B23Q 2003/155407* (2016.11); *B28D 5/0082* (2013.01); *B28D 5/022* (2013.01); *Y10T 483/13* (2015.01); *Y10T 483/174* (2015.01); *Y10T 483/1783* (2015.01); *Y10T 483/1788* (2015.01)

(58) Field of Classification Search
  CPC ........ Y10T 483/1783; Y10T 483/1788; B23Q 3/1554; B23Q 2003/155404; B23Q 2003/155407; B23Q 3/157; B23Q 3/15713; B23Q 17/09; B23Q 17/0904; B23Q 17/0909; B23Q 17/0914
  USPC .... 483/4, 5, 6, 7, 10, 11, 12, 13, 30, 31, 33, 483/36, 51, 53
  See application file for complete search history.

(56) References Cited

U.S. PATENT DOCUMENTS

| | | | | |
|---|---|---|---|---|
| 6,341,600 | B1* | 1/2002 | Wakita | B23D 61/10 125/13.01 |
| 7,258,601 | B2* | 8/2007 | Sato | B24D 5/16 451/178 |
| 9,636,844 | B2* | 5/2017 | Wakita | B27B 5/32 |
| 2014/0243176 | A1* | 8/2014 | Kosonen | B23Q 3/15513 483/1 |
| 2015/0020670 | A1* | 1/2015 | Wakita | H01L 21/304 83/522.12 |
| 2016/0207216 | A1* | 7/2016 | Nitta | B23B 31/307 |
| 2016/0346956 | A1* | 12/2016 | Takekawa | B23Q 17/10 |
| 2017/0239833 | A1* | 8/2017 | Mazzaccherini | B23Q 3/1574 |

* cited by examiner

CUTTING APPARATUS

BACKGROUND OF THE INVENTION

Field of the Invention

The present invention relates to a cutting apparatus including a blade changing unit.

Description of the Related Art

There has been developed a cutting apparatus including a cutting unit in which a cutting blade for cutting a workpiece is detachably mounted and a blade changing unit automatically changing the cutting blade in the cutting unit (see Japanese Patent No. 2617876 and Japanese Patent Laid-open No. 2007-208114, for example). In this kind of cutting apparatus, the cutting blade is composed of an annular support base (hub) having a central insertion hole and an annular cutting edge provided on the outer circumference of the support base. The blade changing unit includes blade mounting and demounting means mounting the cutting blade to a blade mount in such a manner that a boss portion (shaft portion) of the blade mount is inserted through the insertion hole of the support base of the cutting blade and for also demounting the cutting blade from the blade mount. The blade changing unit further includes fastening nut mounting and demounting means mounting a fastening nut to the blade mount in such a manner that the fastening nut is threadedly engaged with the boss portion to fasten the cutting blade and for also demounting the fastening nut from the blade mount. The fastening nut mounting and demounting means includes a support arm and nut rotating means provided at the front end of the support arm for rotating the fastening nut. The blade mounting and demounting means includes a support arm and a holding portion (blade holder) provided at the front end of the support arm for holding the cutting blade.

SUMMARY OF THE INVENTION

In automatically changing the cutting blade by using the blade changing unit, it is necessary to align the holding portion of the blade mounting and demounting means with the boss portion of the blade mount. When the operation of changing the cutting blade by using the blade changing unit is repeated plural times, there is a possibility of misalignment between the holding portion and the boss portion due to temperature changes and shaft degradation. In the case that such misalignment occurs, the boss portion of the blade mount comes into contact with the edge portion (opening end) of the insertion hole of the support base of the cutting blade in inserting the boss portion through the insertion hole, so that metal (aluminum) forming the support base may adhere to the boss portion to cause galling.

Conventionally, in mounting the cutting blade to the boss portion of the blade mount or demounting the cutting blade from the boss portion, the holding portion holding the cutting blade is moved toward or away from the blade mount by operating an air cylinder. Accordingly, when the boss portion of the blade mount comes into contact with the edge portion of the insertion hole of the support base, this contact cannot be detected in the cutting apparatus until the holding portion is caught by the boss portion through the cutting blade to stop the movement. Further, when the boss portion of the blade mount is forcibly inserted into the insertion hole of the support base in the condition where the boss portion is in contact with the edge portion of the insertion hole, there is a possibility of future trouble in the blade changing unit or the blade mount.

It is therefore an object of the present invention to provide a cutting apparatus which can detect the contact between the boss portion of the blade mount and the insertion hole of the cutting blade, thereby preventing future trouble in the blade changing unit or the blade mount.

In accordance with an aspect of the present invention, there is provided a cutting apparatus including a chuck table for holding a workpiece; a cutting unit having a spindle, a blade mount fixed to the spindle at a front end thereof, and a cutting blade detachably mounted on the blade mount for cutting the workpiece held on the chuck table, the cutting blade being composed of an annular support base having a central insertion hole and an annular cutting edge provided on the outer circumference of the support base; a blade changing unit replacing the cutting blade as an old blade with a new blade by demounting the old blade from the blade mount and then mounting the new blade to the blade mount; and a control unit controlling the cutting unit and the blade changing unit, in which the blade mount includes a boss portion adapted to be inserted through the insertion hole of the support base of the cutting blade and extending in the axial direction of the spindle; and a flange portion formed at one end of the boss portion so as to project radially outward from the outer circumference of the boss portion, the flange portion having an end surface adapted to abut against the support base of the cutting blade; the blade changing unit includes a holding portion for detachably holding the support base of the cutting blade; and a moving portion for moving the holding portion in the axial direction of the boss portion toward and away from the blade mount in the condition where the insertion hole of the support base is opposed to the boss portion, thereby mounting the new blade to the boss portion or demounting the old blade from the boss portion; the control unit includes a measuring portion for measuring a signal indicating a force applied to the moving portion of the blade changing unit in mounting the new blade to the blade mount or demounting the old blade from the blade mount; and a determining portion for determining the condition of the blade changing unit and the blade mount according to the signal measured by the measuring portion.

With this configuration, the control unit includes the determining portion for determining the condition of the blade changing unit and the blade mount according to a signal indicating a force applied to the indexing means. Accordingly, whether or not the boss portion of the blade mount has come into contact with the insertion hole of the cutting blade can be determined according to the magnitude of this signal. As a result, it can be prevented that the cutting blade may be forcibly mounted to the blade mount in the condition where the boss portion is in contact with the insertion hole, thereby preventing future trouble in the blade changing unit or the blade mount.

Preferably, the moving portion includes a sensor for detecting a force applied to the moving portion. Preferably, the moving portion includes a motor, and the signal includes at least one of a current, voltage, load, speed, torque, deviation, and position of the motor.

In accordance with another aspect of the present invention, there is provided a cutting apparatus including a chuck table for holding a workpiece; a cutting unit having a spindle, a blade mount fixed to the spindle at a front end thereof, and a cutting blade detachably mounted on the blade mount for cutting the workpiece held on the chuck table, the cutting blade being composed of an annular support base having a central insertion hole and an annular cutting edge provided on the outer circumference of the support base; indexing means rotatably supporting the spindle so that the spindle is movable back and forth in its axial direction; a blade changing unit replacing the cutting blade as an old blade with a new blade by demounting the old blade from the blade mount and then mounting the new blade to the blade mount; and a control unit controlling the cutting unit, the indexing means, and the blade changing unit, in which the blade mount includes a boss portion adapted to be inserted through the insertion hole of the support base of the cutting blade and extending in the axial direction of the spindle; and a flange portion formed at one end of the boss portion so as to project radially outward from the outer circumference of the boss portion, the flange portion having an end surface adapted to abut against the support base of the cutting blade; the blade changing unit includes a holding portion for detachably holding the support base of the cutting blade; and a moving portion for moving the holding portion in the axial direction of the boss portion toward and away from the blade mount in the condition where the insertion hole of the support base is opposed to the boss portion, thereby mounting the new blade to the boss portion or demounting the old blade from the boss portion; the control unit includes a measuring portion for measuring a signal indicating a force applied to the indexing means in mounting the new blade to the blade mount or demounting the old blade from the blade mount; and a determining portion for determining the condition of the blade changing unit and the blade mount according to the signal measured by the measuring portion.

With this configuration, the control unit includes the determining portion for determining the condition of the blade changing unit and the blade mount according to a signal indicating a force applied to the indexing means. Accordingly, whether or not the boss portion of the blade mount has come into contact with the insertion hole of the cutting blade can be determined according to the magnitude of this signal. As a result, it can be prevented that the cutting blade may be forcibly mounted to the blade mount in the condition where the boss portion is in contact with the insertion hole, thereby preventing future trouble in the blade changing unit or the blade mount.

Preferably, the indexing means includes a motor, and the signal includes at least one of a current, voltage, load, speed, torque, deviation, and position of the motor.

The above and other objects, features, and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

A preferred embodiment of the present invention will now be described in detail with reference to the drawings. The present invention is not limited to this preferred embodiment. Further, the components used in this preferred embodiment may include those that can be easily assumed by persons skilled in the art or substantially the same elements as those known in the art. Further, the configurations described below may be suitably combined. Further, the configurations may be variously omitted, replaced, or changed without departing from the scope of the present invention.

First Preferred Embodiment

Figure 1:
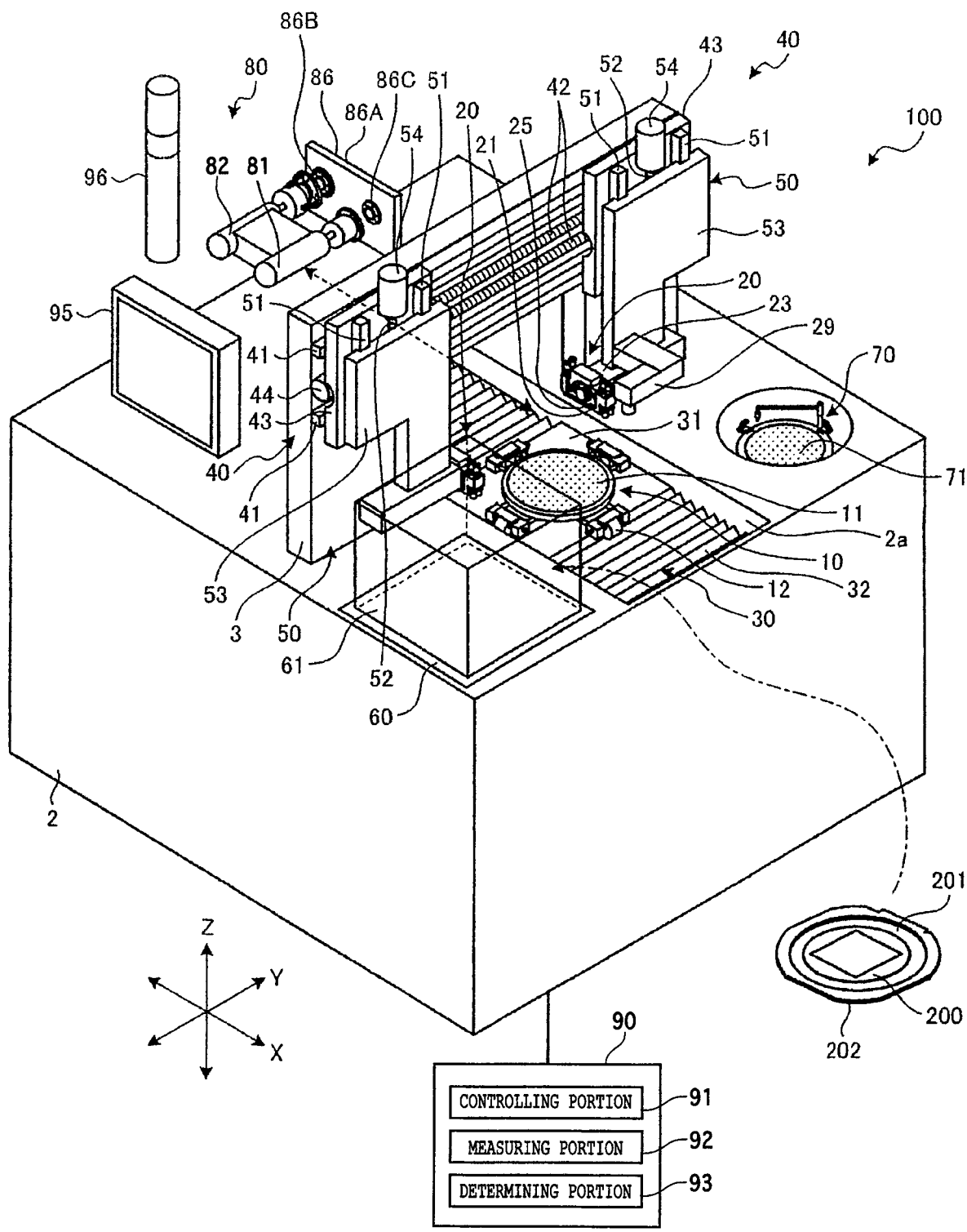
FIG. 1 is a perspective view illustrating the configuration of a cutting apparatus according to a first preferred embodiment of the present invention.
Figure 2:
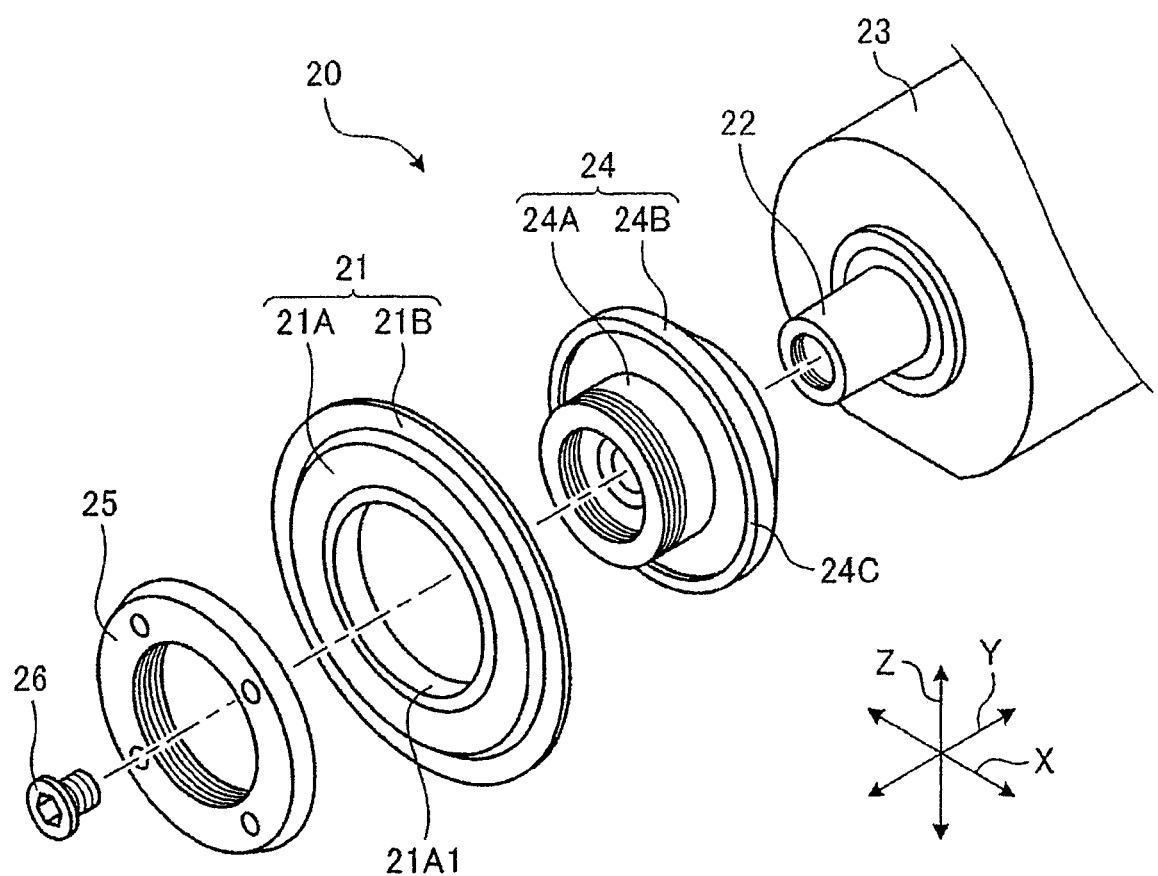
FIG. 2 is an exploded perspective view illustrating the configuration of a cutting unit included in the cutting apparatus illustrated in FIG. 1.
Figure 3:
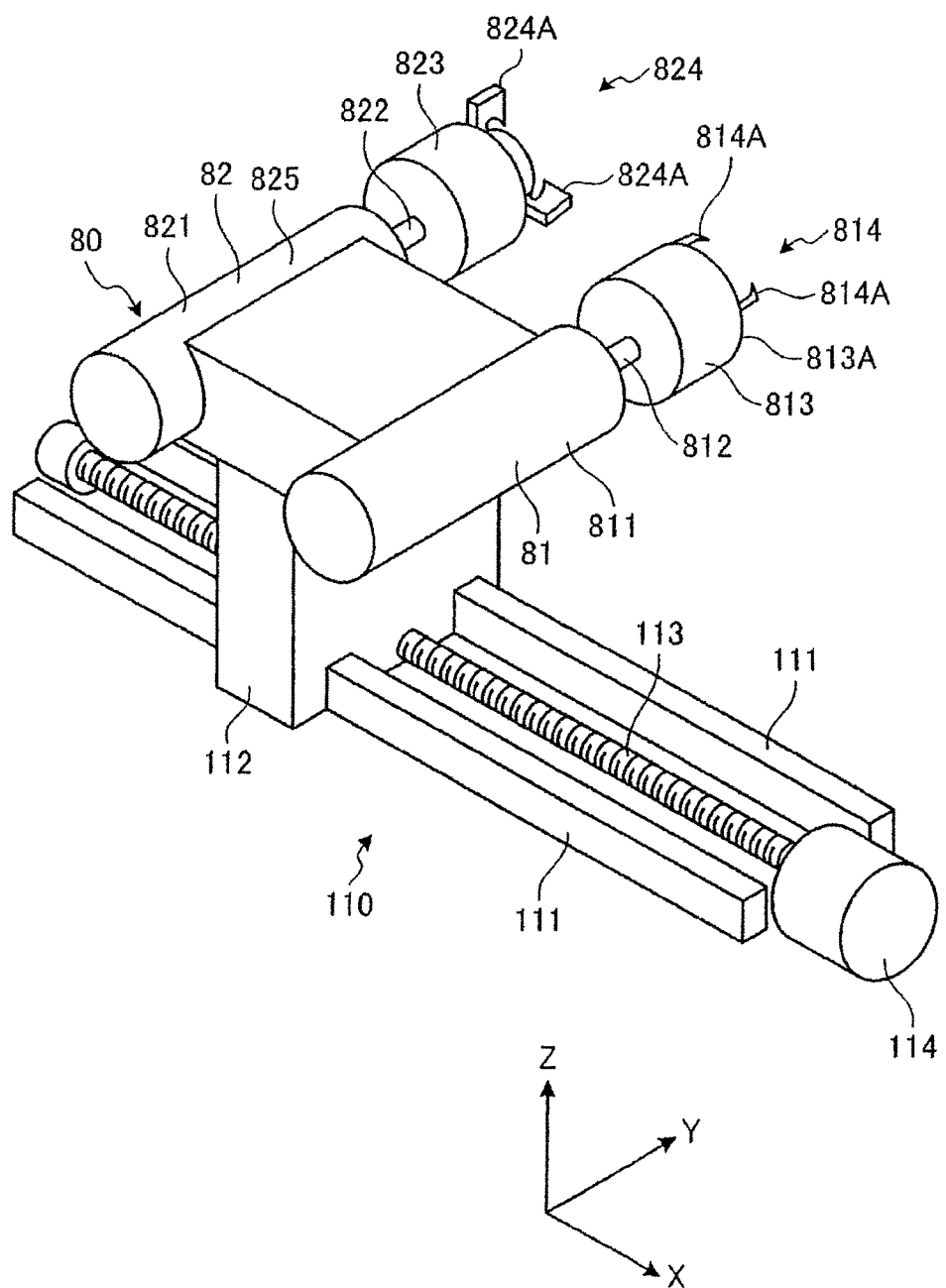
FIG. 3 is a perspective view illustrating the configuration of a blade changing unit and a blade changing unit moving mechanism included in the cutting apparatus illustrated in FIG. 1.
Figure 4:
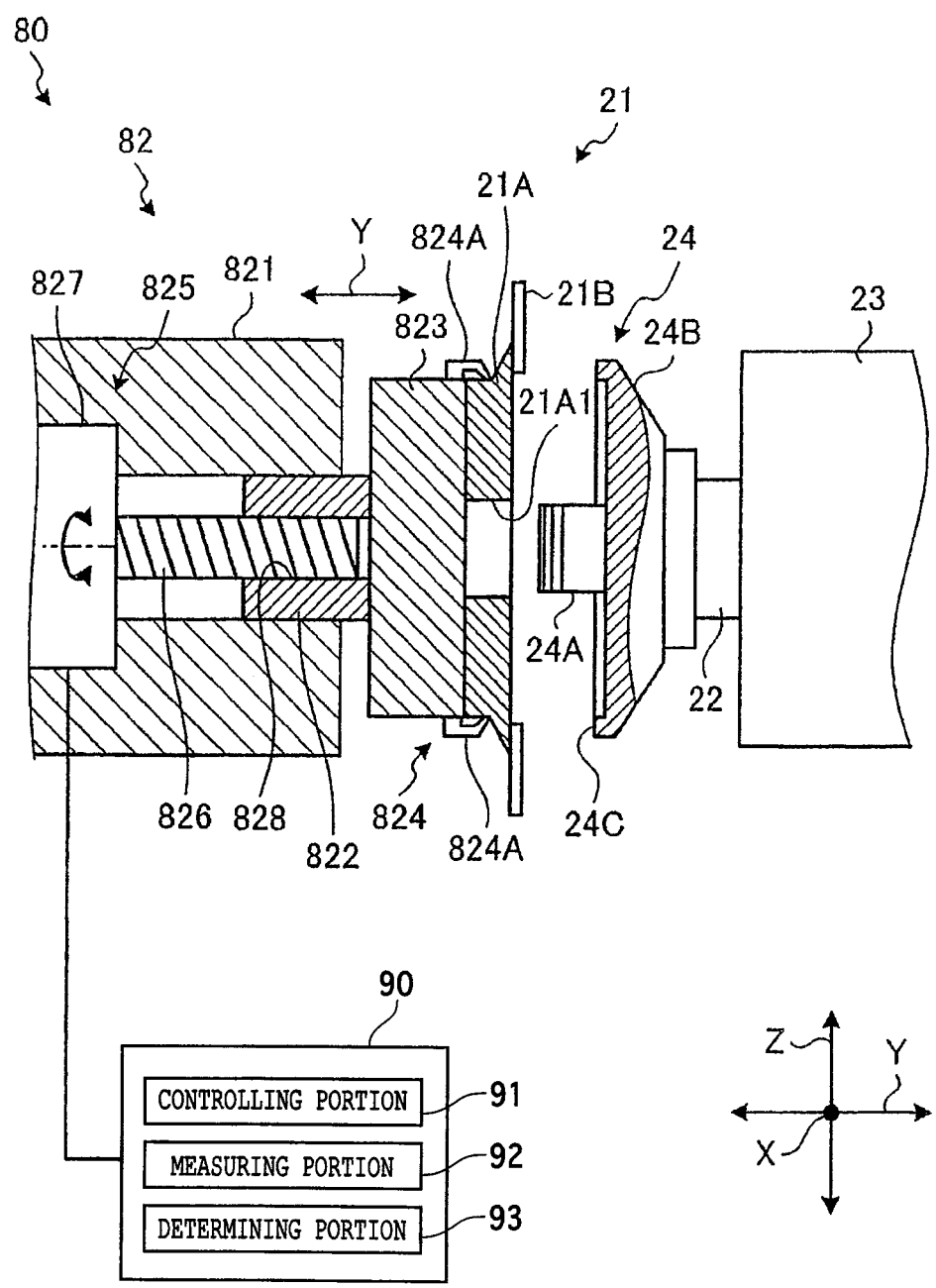
FIG. 4 is a partially sectional side view illustrating the internal configuration of a blade mounting and demounting portion constituting the blade changing unit illustrated in FIG. 3.

FIG. 1 is a perspective view illustrating the configuration of a cutting apparatus according to a first preferred embodiment of the present invention. FIG. 2 is an exploded perspective view of a cutting unit included in the cutting apparatus. FIG. 3 is a perspective view illustrating the configuration of a blade changing unit and a blade changing unit moving mechanism included in the cutting apparatus. FIG. 4 is a partially sectional side view illustrating the internal configuration of a blade mounting and demounting portion of the blade changing unit.

As illustrated in FIG. 1, a reference numeral 100 generally denotes the cutting apparatus according to the first preferred embodiment. The cutting apparatus 100 is an apparatus for cutting a wafer (workpiece) 200 supported through a dicing tape 201 to an annular frame 202. The cutting apparatus 100 includes a chuck table 10, a pair of cutting units 20 each having a cutting blade 21, work feeding means (X moving means) 30, a pair of indexing means (Y moving means) 40, a pair of cutter feeding means (Z moving means) 50, a cassette elevator 60, a cleaning unit 70, a pair of blade changing units 80 (one of which being illustrated), and a control unit 90. The cutting apparatus 100 further includes transfer means (not illustrated) for transferring the wafer 200 supported through the dicing tape 201 to the annular frame 202 to the chuck table 10, the cassette elevator 60, and the cleaning unit 70. In the cutting apparatus 100, the Y-axis direction (indexing direction) illustrated by an arrow Y in FIG. 1 is defined as the direction of extension of the rotation axis of the cutting blade 21 of each cutting unit 20. The X-axis direction (work feeding direction) illustrated by an arrow X in FIG. 1 is defined as the direction perpendicular to the rotation axis of the cutting blade 21 of each cutting unit 20 in a horizontal plane. The Z-axis direction (cutter feeding direction) illustrated by an arrow Z in FIG. 1 is defined as a vertical direction. That is, the X-axis direction and the Y-axis direction are perpendicular to each other in the same horizontal plane, and the Z-axis direction is perpendicular to this horizontal plane.

As illustrated in FIG. 1, the wafer 200 as a workpiece is a disk-shaped wafer such as a semiconductor wafer and an optical device wafer. The semiconductor wafer is formed of silicon, for example, as a base material. The optical device wafer is formed of sapphire or SiC (silicon carbide), for example, as a base material. Although not illustrated, a plurality of crossing division lines are formed on the front side of the wafer 200 to thereby define a plurality of separate regions where a plurality of devices such as ICs (integrated circuits) are respectively formed. The dicing tape 201 is a circular adhesive tape, and the annular frame 202 is a substantially circular member having a circular inside opening for accommodating the wafer 200. The back side of the wafer 200 is attached to the central portion of the dicing tape 201, and the annular frame 202 is attached to the peripheral portion of the dicing tape 201 in such a manner that the wafer 200 is located in the inside opening of the annular frame 202. Thus, the wafer 200 is supported through the dicing tape 201 to the annular frame 202 as illustrated in FIG. 1. The workpiece is not limited in material, shape, structure, size, etc. For example, the workpiece may be a substrate formed of any other semiconductors, ceramic, resin (plastic), or metal.

The cutting apparatus 100 further includes a base housing 2 having an upper surface, in which an opening 2a elongated in the X-axis direction is formed on the upper surface of the base housing 2. The chuck table 10 is provided in this opening 2a of the base housing 2 so as to be movable in the X-axis direction. The chuck table 10 has a holding surface 11 and a plurality of (e.g., four) clamps 12. The chuck table 10 is a disk-shaped member adapted to be rotated by rotating means (not illustrated). That is, the chuck table 10 has a rotation axis substantially parallel to the Z-axis direction (vertical direction). The holding surface 11 for holding the wafer 100 is formed as an upper surface of the chuck table 10, which is oriented upward in the vertical direction. That is, the holding surface 11 is a substantially horizontal surface. The holding surface 11 is formed of porous ceramic, for example. The holding surface 11 is connected to a vacuum source (not illustrated), so that the wafer 200 can be held on the holding surface 11 under suction by a vacuum applied from the vacuum source. The four clamps 12 for clamping the annular frame 202 supporting the wafer 200 held on the holding surface 11 are provided on the outer circumference of the chuck table 10 so as to be arranged at equal intervals. The annular frame 202 is clamped by the four clamps 12 so as to be held between the upper surface of the chuck table 10 and each clamp 12.

Each cutting unit 20 functions to cut the wafer 200 held on the chuck table 10. A double column type support frame 3 is provided on the upper surface of the base housing 2 so as to straddle the opening 2a. That is, the support frame 3 is composed of a pair of columns standing from the upper surface of the base housing 2 and a horizontal bar connecting the upper ends of the two columns. One of the two cutting units 20 is supported through the corresponding Y moving means 40 and the corresponding Z moving means 50 to one of the two columns. The other cutting unit 20 is supported through the corresponding Y moving means 40 and the corresponding Z moving means 50 to the other column.

As illustrated in FIG. 2, each cutting unit 20 includes a spindle housing 23, spindle 22, blade mount 24, cutting blade 21, fastening nut 25, and bolt 26. Although not illustrated, each cutting unit 20 further includes a nozzle for supplying a cutting water to the cutting edge of the cutting blade 21 and the working point on the wafer 200 in cutting the wafer 200.

The cutting blade 21 is a so-called hub blade including an annular support base 21A and an annular cutting edge 21B fixed to the outer circumference of the support base 21A for cutting the wafer 200. The support base 21A is formed of metal such as aluminum. The support base 21A has a central insertion hole 21A1. The cutting edge 21B is composed of abrasive grains of diamond or Cubic Boron Nitride (CBN), for example, and a bond (binder) of metal or resin, for example, for fixing the abrasive grains. The cutting edge 21B has a predetermined thickness.

The spindle 22 functions to rotate the cutting blade 21, thereby cutting the wafer 200. The spindle 22 has a rotation axis extending in the Y-axis direction. The spindle housing 23 is fixed to the corresponding Z moving means 50 and functions to rotatably support the spindle 22. A motor (not illustrated) for rotating the spindle 22 is provided in the spindle housing 23. That is, the motor is connected to one end (base end) of the spindle 22. The other end (front end) of the spindle 22 projects outward from the spindle housing 23, and the blade mount 24 is mounted on a projecting portion of the spindle 22 at its front end.

The blade mount 24 functions to support the cutting blade 21. The blade mount 24 is formed of metal. The blade mount 24 includes a cylindrical boss portion 24A adapted to be mounted on the outer circumference of the front end portion (projecting portion) of the spindle 22 and a flange portion 24B formed on the outer circumferential surface of the boss portion 24A so as to project radially outward. The boss portion 24A extends in the axial direction of the spindle 22, and an external thread 24Aa is formed on the outer circumferential surface of the boss portion 24A. The boss portion 24A is adapted to be inserted through the insertion hole 21A1 of the support base 21A of the cutting blade 21. The flange portion 24B has an end surface 24C adapted to abut against the support base 21A of the cutting blade 21 mounted on the boss portion 24A.

The blade mount 24 is fixed to the spindle 22 by the bolt 26 in such a manner that the front end portion of the spindle 22 is fitted into the axial hole of the boss portion 24A, and the bolt 26 is next threadedly engaged with an internal thread 22a formed at the front end portion of the spindle 22. Further, the boss portion 24A is inserted through the insertion hole 21A1 of the cutting blade 21, and the fastening nut 25 is threadedly engaged with the external thread 24Aa of the boss portion 24A. Accordingly, the cutting blade 21 is firmly sandwiched between the fastening nut 25 and the end surface 24C of the flange portion 24B of the blade mount 24.

Further, each cutting unit 20 is provided with an imaging unit 29 for imaging the wafer 200 as illustrated in FIG. 1, in which the imaging unit 29 is movable together with the cutting unit 20. The imaging unit 29 includes a charge-coupled device (CCD) camera for imaging the upper surface of the wafer 200 held on the chuck table 10. Each imaging unit 29 functions to obtain an image for use in performing the alignment between the division lines of the wafer 200 and the cutting blade 21.

The X moving means 30 functions to relatively move the chuck table 10 and each cutting unit 20 in the X-axis direction. In this preferred embodiment, the X moving means 30 is adapted to move the chuck table 10 in the X-axis direction. Although not illustrated, the X moving means 30 includes a ball screw extending in the X-axis direction and a drive source such as a motor for rotating the ball screw. The ball screw is connected through a nut to an X-axis movable base for supporting the chuck table 10. Accordingly, by operating the motor to rotate the ball screw, the X-axis movable base can be moved in the X-axis direction, thereby moving the chuck table 10 in the X-axis direction. The X moving means 30 further includes a cover member 31 provided in the opening 2a for covering the X-axis movable base and a pair of bellows members 32 connected to the opposite ends of the cover member 31 in the X-axis direction so as to cover the opening 2a.

Each Y moving means 40 functions to relatively move the chuck table 10 and the corresponding cutting unit 20 in the Y-axis direction. In this preferred embodiment, each Y moving means 40 is adapted to move the corresponding cutting unit 20 in the Y-axis direction. More specifically, each Y moving means 40 includes a pair of parallel guide rails 41 extending in the Y-axis direction, a ball screw 42 extending parallel to the guide rails 41, a nut (not illustrated) threadedly engaged with the ball screw 42, a Y-axis movable base 43 fixed to this nut and slidably mounted on the guide rails 41, and a motor 44 for rotating the ball screw 42. Accordingly, by operating the motor 44 to rotate the ball screw 42, the Y-axis movable base 43 for supporting the corresponding cutting unit 20 and the corresponding Z moving means 50 can be moved in the Y-axis direction, thereby moving the corresponding cutting unit 20 in the Y-axis direction.

Each Z moving means 50 functions to move the corresponding cutting unit 20 in the Z-axis direction perpendicular to the holding surface 11 of the chuck table 10. More specifically, each Z moving means 50 includes a pair of parallel guide rails 51 extending in the Z-axis direction and fixed to the corresponding Y-axis movable base 43, a ball screw 52 extending parallel to the guide rails 51, a nut (not illustrated) threadedly engaged with the ball screw 52, a Z-axis movable base 53 fixed to this nut and slidably mounted on the guide rails 51, and a motor 54 for rotating the ball screw 52. Accordingly, by operating the motor 54 to rotate the ball screw 52, the Z-axis movable base 53 for supporting the corresponding cutting unit 20 can be moved in the Z-axis direction, thereby moving the corresponding cutting unit 20 in the Z-axis direction.

The cassette elevator 60 is provided in the base housing 2 at a front portion thereof. The cassette elevator 60 functions to vertically movably support a cassette 61 for storing a plurality of wafers 200. The cleaning unit 70 is provided in the base housing 2 at a rear portion thereof. The cleaning unit 70 includes a spinner table 71 for holding the wafer 200 cut by each cutting unit 20 to clean the wafer 200 with a cleaning water or the like.

Each blade changing unit 80 functions to automatically change the cutting blade 21 mounted in the corresponding cutting unit 20. In FIG. 1, one of the pair of blade changing units 80 is illustrated for convenience of illustration. That is, the pair of blade changing units 80 are provided so as to respectively correspond to the pair of cutting units 20. As illustrated in FIG. 1, each blade changing unit 80 is normally located behind the support frame 3. Each blade changing unit 80 is adapted to be moved along the opening 2a of the base housing 2 in the X-axis direction so as to take a standby position set behind the support frame 3 apart from the corresponding cutting unit 20 and a working position set so as to be opposed to the cutting blade 21 of the corresponding cutting unit 20. A blade rack 86 is located in the vicinity of the standby position, so as to store the cutting blade 21 demounted from the cutting unit 20 and also store the cutting blade 21 to be mounted to the cutting unit 20. The blade rack 86 includes a frame member 86A opposed to the blade changing unit 80, a new blade storing portion 86B provided on the frame member 86A at the same level as that of the blade changing unit 80 for storing a new cutting blade 21 to be mounted to the cutting unit 20, and an old blade storing portion 86C provided on the frame member 86A at a position adjacent to the new blade storing portion 86B for storing the old cutting blade 21 demounted from the cutting unit 20.

As illustrated in FIG. 3, each blade changing unit 80 is movably supported to a blade changing unit moving mechanism 110 for moving the blade changing unit 80 in the X-axis direction. The blade changing unit moving mechanism 110 includes a pair of parallel guide rails 111 extending in the X-axis direction, a moving block 112 slidably mounted on the guide rails 111, a nut (not illustrated) provided at the lower end of the moving block 112, a ball screw 113 threadedly engaged with this nut and extending in the X-axis direction, and a motor 114 connected to one end of the ball screw 113 for rotating the ball screw 113. Accordingly, by operating the motor 114 to rotate the ball screw 113, the moving block 112 can be moved in the X-axis direction along the guide rails 111. In this preferred embodiment, the blade changing unit moving mechanism 110 is located in the opening 2a of the base housing 2 in such a manner that an upper portion of the moving block 112 and the whole of the blade unit changing unit 80 are exposed to the outside of the base housing 2.

The blade changing unit 80 is fixed to the upper end of the moving block 112. The blade changing unit 80 includes a fastening nut mounting and demounting portion 81 for mounting the fastening nut 25 to the corresponding cutting unit 20 (the blade mount 24) and demounting the fastening nut 25 from the corresponding cutting unit 20 (the blade mount 24) and a blade mounting and demounting portion 82 for mounting the cutting blade 21 (new blade) to the corresponding cutting unit 20 and demounting the cutting blade 21 (old blade) from the corresponding cutting unit 20.

The fastening nut mounting and demounting portion 81 includes a cylindrical first housing 811 and a spindle 812 rotatably supported to the first housing 811, the spindle 812 having a rotation axis extending in the Y-axis direction. One end (base end) of the spindle 812 is stored in the first housing 811 and connected to a motor (not illustrated) for rotating the spindle 812. The other end (front end) of the spindle 812 is exposed to the outside of the first housing 811. A first base 813 as a solid cylindrical member is fixed to the other end of the spindle 812. The first base 813 has a front end surface 813A, and a nut holder 814 including a plurality of (e.g., four) claws 814A is provided on the front end surface 813A along the outer circumference thereof.

Accordingly, by operating the four claws 814A of the nut holder 814 to hold the fastening nut 25 (see FIG. 2) and next rotating the spindle 812, the fastening nut 25 can be mounted to the blade mount 24 of the cutting unit 20 or can be demounted from the blade mount 24.

The blade mounting and demounting portion 82 includes a cylindrical second housing 821 and an arm 822 extending from the second housing 821 in the Y-axis direction. A second base 823 as a solid cylindrical member is fixed to the front end of the arm 822. The second base 823 has a front end surface 823A, and a blade holder (holding portion) 824 including a plurality of (e.g., four) claws 824A is provided on the front end surface 823A along the outer circumference thereof. Further, a moving portion 825 is provided in the second housing 821, so as to move the second base 823 and the blade holder 824 in the Y-axis direction (in the axial direction of the boss portion 24A of the blade mount 24). The second base 823 and the blade holder 824 are axially movable toward and away from the blade mount 24.

As illustrated in FIG. 4, the moving portion 825 includes a ball screw 826 having a rotation axis extending in the Y-axis direction and a motor 827 connected to one end (base end) of the ball screw 826 for rotating the ball screw 826. The motor 827 is connected to a driver (not illustrated). The other end (front end) of the ball screw 826 is threadedly engaged with a tapped hole 828 formed in the arm 822. The arm 822 has a polygonal outer circumferential surface, and it is fitted in the second housing 821 such that the rotation of the arm 822 about the axis of the ball screw 826 is prevented. Accordingly, by operating the motor 827 to rotate the ball screw 826 in a forward direction or a reverse direction, the arm 822 threadedly engaged with the ball screw 826 can be slidingly moved back and forth in the second housing 821 in the Y-axis direction.

The outer circumferential surface of the support base 21A of the cutting blade 21 is held by the four claws 824A of the blade holder 824, and the blade holder 824 in which the insertion hole 21A1 of the support base 21A is opposed to the boss portion 24A of the blade mount 24 can be moved back and forth in the Y-axis direction by rotating the ball screw 826. Accordingly, the cutting blade 21 (new blade) can be mounted to the boss portion 24A of the blade mount 24 of each cutting unit 20 or the cutting blade 21 (old blade) can be demounted from the boss portion 24A.

The control unit 90 functions to control the operation of each cutting unit 20 and each blade changing unit 80 and the operation of the other components of the cutting apparatus 100. As illustrated in FIGS. 1 and 4, the control unit 90 includes a controlling portion 91, a measuring portion 92, and a determining portion 93. The controlling portion 91 has a microprocessor such as central processing unit (CPU), in which a computer program stored in read only memory (ROM) is executed in random access memory (RAM) by the microprocessor, thereby producing a control signal for controlling each component in the cutting apparatus 100. The measuring portion 92 functions to measure a signal output from the motor 827 as a force applied to the moving portion 825 of the blade mounting and demounting portion 82. For example, the signal to be measured by the measuring portion 92 includes at least one of the current value, voltage value, load, rotational speed, and torque value of the motor 827 and the position of the ball screw 826. Alternatively, this signal may include a deviation or standard deviation of at least one of the above values (parameters). The deviation is a value indicating a deviation of each above value from a given reference value or target value. The standard deviation is a value indicating variations in plural data.

The determining portion 93 functions to determine the condition of the blade mounting and demounting portion 82 and the blade mount 24 according to the signal measured above. More specifically, in mounting or demounting the cutting blade 21, the torque value of the motor 827 is monitored. When this torque value becomes larger than a predetermined threshold value, the determining portion 93 determines that the boss portion 24A of the blade mount 24 is in contact with the insertion hole 21A1 of the cutting blade 21, causing a condition that the cutting blade 21 is not properly mounted to the blade mount 24, that is, the boss portion 24A of the blade mount 24 is not properly inserted in the insertion hole 21A1 of the cutting blade 21. In mounting the cutting blade 21 to the boss portion 24A of the blade mount 24, it is preferable that the motor 827 is controlled to move the cutting blade 21 in the Y-axis direction by an amount such that the cutting blade 21 does not abut against the end surface 24C of the flange portion 24B of the blade mount 24 and that the boss portion 24A of the blade mount 24 is inserted into the insertion hole 21A1 of the cutting blade 21. With this configuration, the contact between the boss portion 24A of the blade mount 24 and the insertion hole 21A1 of the cutting blade 21 and the contact between the cutting blade 21 and the end surface 24C of the flange portion 24B of the blade mount 24 can be separately determined.

As illustrated in FIG. 1, the control unit 90 is connected to a display unit 95 and an indicator lamp 96. The display unit 95 is configured by a liquid crystal display, for example, for displaying images in a cutting operation, error information, etc. The indicator lamp 96 functions to notify an operator of the error information.

The operation of changing the cutting blade 21 will now be described. In the case of demounting the cutting blade 21 from the cutting unit 20 by using the blade changing unit 80, the blade changing unit moving mechanism 110 is first operated to move the blade changing unit 80 to the working position, thereby opposing the fastening nut mounting and demounting portion 81 to the cutting unit 20. Thereafter, the fastening nut 25 (see FIG. 2) is held by the four claws 814A of the nut holder 814 of the fastening nut mounting and demounting portion 81, and the spindle 812 is next rotated to thereby demount the fastening nut 25 from the blade mount 24 of the cutting unit 20.

Thereafter, the blade mounting and demounting portion 82 of the blade changing unit 80 is opposed to the cutting unit 20 as illustrated in FIG. 4. In this condition, the motor 827 of the moving portion 825 is normally operated to normally rotate the ball screw 826 and thereby axially move the arm 822 in the Y-axis direction toward the cutting unit 20. That is, the blade holder 824 is moved toward the cutting blade 21 mounted on the boss portion 24A of the blade mount 24 of the cutting unit 20. Thereafter, the support base 21A of the cutting blade 21 is held by the four claws 824A of the blade holder 824. Thereafter, the motor 827 of the moving portion 825 is reversely operated to reversely rotate the ball screw 826 and thereby axially move the arm 822 in the Y-axis direction away from the cutting unit 20. That is, the blade holder 824 is moved away from the boss portion 24A of the blade mount 24 of the cutting unit 20. Thus, the cutting blade 21 is demounted from the blade mount 24 of the cutting unit 20.

Figure 5:
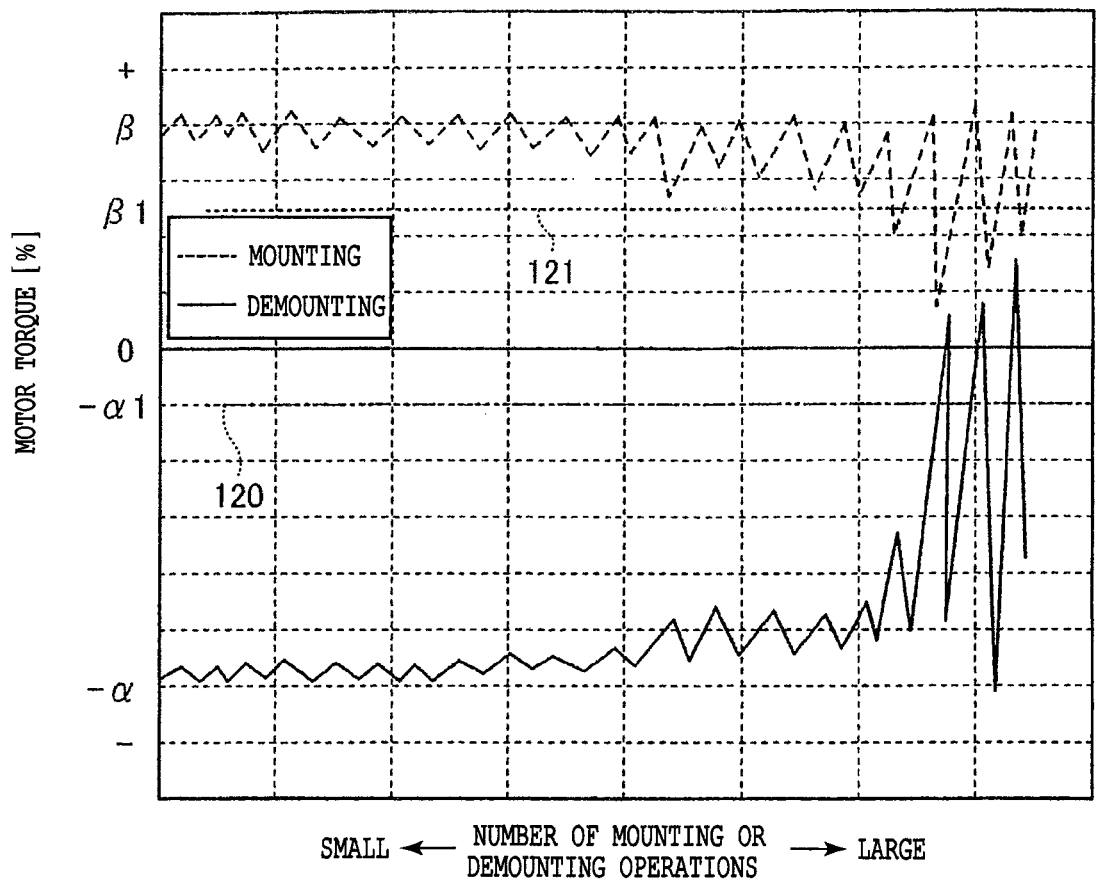
FIG. 5 is a graph illustrating changes in motor torque (%) in mounting and demounting a cutting blade according to the first preferred embodiment.

In this case, the measuring portion 92 of the control unit 90 measures the torque (%) of the motor 827 as a force applied to the moving portion 825. This torque (%) is the rate of an output torque value to a maximum torque value. FIG. 5 is a graph illustrating changes in the torque (%) in mounting and demounting the cutting blade 21. In FIG. 5, the torque (%) generated in mounting the cutting blade 21 is indicated as a positive value, so that the torque (%) generated in demounting the cutting blade 21 is indicated as a negative value. When the cutting blade 21 is smoothly demounted from the blade mount 24, the torque (%) measured in an initial stage becomes near −α (%). However, with an increase in number of demounting operations, there is a possibility that the insertion hole 21A1 of the cutting blade 21 may come into contact with the boss portion 24A of the blade mount 24. When this contact causes galling, the torque (%) measured tends to vary and increase beyond 0 (%). In this preferred embodiment, a predetermined threshold value 120 is set at $-\alpha 1$ (%), where $-\alpha 1$ is in the range of $-\alpha < -\alpha 1 < 0$. When the torque (%) measured becomes larger than this predetermined threshold value 120 (that is, when $\alpha$ decreases and becomes smaller than $\alpha 1$), the determining portion 93 determines that the insertion hole 21A1 of the cutting blade 21 is in contact with the boss portion 24A of the blade mount 24.

When the determining portion 93 determines the contact between the cutting blade 21 and the boss portion 24A of the blade mount 24, the controlling portion 91 stops the operation of demounting the cutting blade 21 and displays this contact condition on the display unit 95. At the same time, the indicator lamp 96 is operated to notify the operator of this contact condition. Accordingly, the operator can take any measures against this contact condition. For example, the blade mount 24 may be cleaned or replaced or the positional relation between the blade mounting and demounting portion 82 and the blade mount 24 may be adjusted. As a result, future trouble in the blade changing unit 80 or the blade mount 24 can be prevented.

When the torque (%) measured does not become larger than the threshold value 120, that is, when the cutting blade 21 is smoothly demounted from the blade mount 24, the blade changing unit moving mechanism 110 is operated to move the blade changing unit 80 to the standby position. Thereafter, the cutting blade 21 demounted is stored into the old blade storing portion 86C of the blade rack 86.

Conversely, in the case of mounting the cutting blade 21 (new blade) stored in the blade rack 86 to the cutting unit 20 by using the blade changing unit 80, the blade mounting and demounting portion 82 of the blade changing unit 80 is operated to take the new cutting blade 21 out of the new blade storing portion 86B of the blade rack 86. Thereafter, the blade changing unit moving mechanism 110 is operated to move the blade changing unit 80 to the working position, thereby opposing the blade mounting and demounting portion 82 to the blade mount 24 of the cutting unit 20.

Thereafter, the motor 827 of the moving portion 825 is operated to rotate the ball screw 826 and thereby axially move the arm 822 in the Y-axis direction toward the blade mount 24 of the cutting unit 20. That is, the cutting blade 21 held by the blade holder 824 is moved toward the blade mount 24. Accordingly, the boss portion 24A of the blade mount 24 is inserted into the insertion hole 21A1 of the cutting blade 21, thereby mounting the cutting blade 21 on the boss portion 24A.

In this case, the measuring portion 92 of the control unit 90 measures the torque (%) of the motor 827 as a force applied to the moving portion 825. As illustrated in FIG. 5, when the cutting blade 21 is smoothly mounted on the blade mount 24, the torque (%) measured in an initial stage becomes near $\beta$ (%). However, with an increase in number of mounting operations, there is a possibility that the insertion hole 21A1 of the cutting blade 21 may come into contact with the boss portion 24A of the blade mount 24. When this contact causes galling, the torque (%) measured tends to vary and decrease to near 0 (%). In this preferred embodiment, a predetermined threshold value 121 is set at $\beta 1$ (%), where $\beta 1$ is in the range of $0 < \beta 1 < \beta$. When the torque (%) measured becomes smaller than this predetermined threshold value 121, the determining portion 93 determines that the insertion hole 21A1 of the cutting blade 21 is in contact with the boss portion 24A of the blade mount 24.

When the determining portion 93 determines the contact between the cutting blade 21 and the boss portion 24A of the blade mount 24, the controlling portion 91 stops the operation of mounting the cutting blade 21 and displays this contact condition on the display unit 95. At the same time, the indicator lamp 96 is operated to notify the operator of this contact condition. Accordingly, the operator can take any measures against this contact condition. For example, the blade mount 24 may be cleaned or replaced or the positional relation between the blade mounting and demounting portion 82 and the blade mount 24 may be adjusted. As a result, future trouble in the blade changing unit 80 or the blade mount 24 can be prevented.

When the torque (%) measured does not become smaller than the threshold value 121, that is, when the cutting blade 21 is smoothly mounted on the blade mount 24, the blade changing unit moving mechanism 110 is operated to oppose the fastening nut mounting and demounting portion 81 to the cutting blade 21 just mounted on the blade mount 24 in the condition where the fastening nut 25 remains held by the nut holder 814. Thereafter, the spindle 812 is rotated in the condition where the fastening nut 25 is held by the four claws 814A of the nut holder 814 of the fastening nut mounting and demounting portion 81, thereby mounting the fastening nut 25 to the boss portion 24A of the blade mount 24 of the cutting unit 20 in the condition where the cutting blade 21 is sandwiched between the fastening nut 25 and the flange portion 24B of the blade mount 24.

[Modification]

Figure 6:
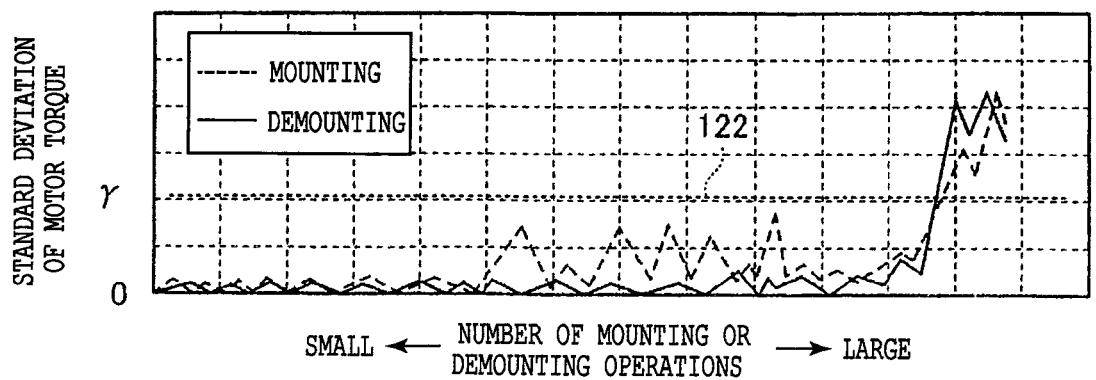
FIG. 6 is a graph illustrating changes in standard deviation of motor torque in mounting and demounting a cutting blade according to a modification of the first preferred embodiment.

In the above preferred embodiment, it is determined that the insertion hole 21A1 of the cutting blade 21 is in contact with the boss portion 24A of the blade mount 24 when the torque (%) measured becomes larger than $-\alpha 1$ (%) or smaller than $\beta 1$ (%). This configuration is merely illustrative. FIG. 6 is a graph illustrating changes in standard deviation of a motor torque in mounting and demounting the cutting blade 21 according to a modification of the first preferred embodiment. In this modification, the standard deviation of the torque value of the motor 827 is determined in the time period from the start to the end of the mounting of the cutting blade 21 and in the time period from the start to the end of the demounting of the cutting blade 21. This standard deviation is monitored with an increase in number of the mounting and demounting operations as illustrated in FIG. 6. When the cutting blade 21 is smoothly mounted to the blade mount 24 or demounted from the blade mount 24, the torque value of the motor 827 is stable and the standard deviation of the torque value of the motor 827 changes slightly near 0. In contrast, when the insertion hole 21A1 of the cutting blade 21 comes into contact with the boss portion 24A of the blade mount 24 to cause galling, the torque value measured is increased, so that the standard deviation is rapidly increased.

In this modification, a predetermined threshold value 122 is set at $\gamma$, where $0 < \gamma$ holds. When the standard deviation of the torque value measured becomes larger than this threshold value 122, the determining portion 93 determines that the insertion hole 21A1 of the cutting blade 21 is in contact with the boss portion 24A of the blade mount 24. Thus, the threshold value 122 can be commonly used both in mounting the cutting blade and in demounting the cutting blade 21. Accordingly, whether or not the insertion hole 21A1 of the cutting blade 21 is in contact with the boss portion 24A of the blade mount 24 can be easily determined. In this preferred embodiment, the torque (%) or the standard deviation of the torque value of the motor 827 is used as a signal indicating a force applied to the moving portion 825. However, this signal may also include at least one of the current value, voltage value, load, and rotational speed of the motor 827 and the position of the ball screw 826. Alternatively, this signal may include a deviation or standard deviation of at least one of the above values (parameters). Further, the blade changing unit 80 may be modified in such a manner that a force sensor (not illustrated) is provided between the arm 822 and the second base 823. In this case, a force detected by the force sensor is used by the measuring portion 92 to measure a signal indicating a force applied to the moving portion 825. The force sensor is a sensor for detecting a force (load or moment) applied to the moving portion 825 in operating the motor 827.

Second Preferred Embodiment

Figure 7:
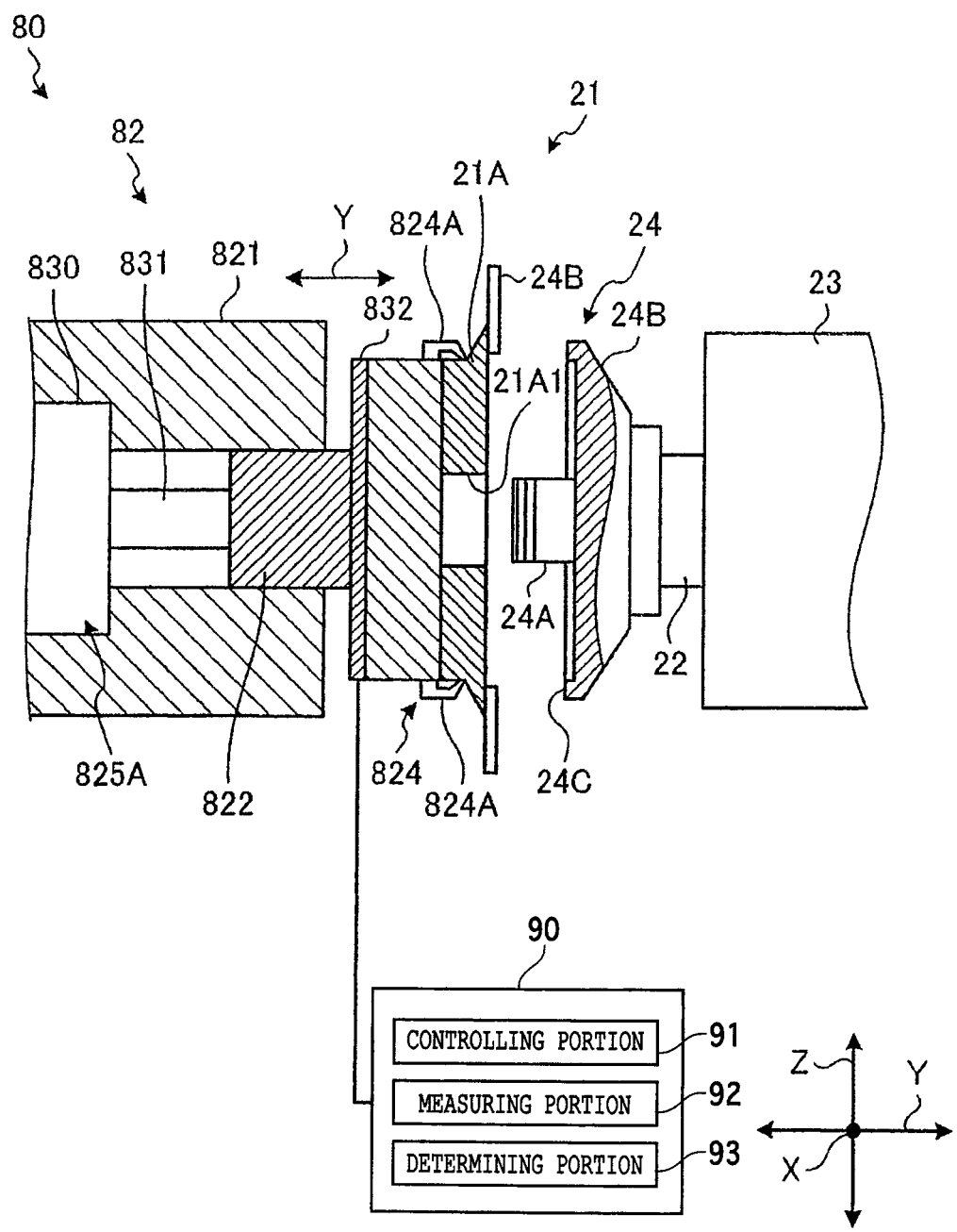
FIG. 7 is a partially sectional side view illustrating the internal configuration of a blade mounting and demounting portion of a blade changing unit included in a cutting apparatus according to a second preferred embodiment of the present invention.

A second preferred embodiment of the present invention will now be described with reference to FIG. 7. FIG. 7 is a partially sectional side view illustrating the internal configuration of a blade mounting and demounting portion 82 of a blade changing unit 80 in a cutting apparatus according to the second preferred embodiment. The second preferred embodiment is different from the first preferred embodiment in the configuration of the moving portion 825 of the blade mounting and demounting portion 82. Accordingly, only a difference in the configuration of the moving portion 825 will now be described, in which the same parts as those in the first preferred embodiment are denoted by the same reference numerals.

As illustrated in FIG. 7, the blade mounting and demounting portion 82 includes a cylindrical second housing 821 and an arm 822 extending from the second housing 821 in the Y-axis direction. A second base 823 is fixed through a force sensor 832 to the front end of the arm 822. A blade holder 824 is provided at the front end of the second base 823. Further, a moving portion 825A is provided in the second housing 821, so as to move the second base 823 and the blade holder 824 in the Y-axis direction (in the axial direction of the boss portion 24A of the blade mount 24). The second base 823 and the blade holder 824 are axially movable toward and away from the blade mount 24. The moving portion 825A includes an air cylinder 830 provided in the second housing 821. The air cylinder 830 has a cylinder rod 831 extending in the Y-axis direction and adapted to be moved back and forth in the Y-axis direction. One end (base end) of the cylinder rod 831 is accommodated in the air cylinder 830, and the other end (front end) of the cylinder rod 831 is connected to the arm 822. Accordingly, by operating the air cylinder 830 to axially move the cylinder rod 831 forward or backward, the arm 822 connected to the cylinder rod 831 can be slidingly moved back and forth in the second housing 821 in the Y-axis direction.

The force sensor 832 is interposed between the front end of the arm 822 and the second base 823. The force sensor 832 is a sensor for detecting a force (load or moment) applied to the moving portion 825A in operating the air cylinder 830. The force sensor 832 has a plurality of strain gauges (not illustrated), for example, in which the amount of strain of the strain gauges is detected to thereby detect a force applied to the moving portion 825A. A detection signal from the force sensor 832 is output to the measuring portion 92, and the force applied to the moving portion 825A is measured by the measuring portion 92 according to this detection signal.

The determining portion 93 functions to determine the condition of the blade mounting and demounting portion 82 and the blade mount 24 according to the force measured above. More specifically, the load detected by the force sensor 832 is monitored in mounting or demounting the cutting blade 21. When this load becomes larger than a predetermined threshold value, the determining portion 93 determines that the boss portion 24A of the blade mount 24 has come into contact with the insertion hole 21A1 of the cutting blade 21, that is, the boss portion 24A is not properly inserted in the insertion hole 21A1. In mounting the cutting blade 21 to the boss portion 24A of the blade mount 24, it is preferable that the stroke of the cylinder rod 831 of the air cylinder 830 is controlled so that the cutting blade 21 does not abut against the end surface 24C of the flange portion 24B of the blade mount 24, and then the boss portion 24A of the blade mount 24 is properly inserted into the insertion hole 21A1 of the cutting blade 21. According to the configuration of the second preferred embodiment, the contact between the cutting blade 21 and the boss portion 24A of the blade mount 24 and the contact between the cutting blade 21 and the end surface 24C of the flange portion 24B of the blade mount 24 can be separately determined.

As described above, the moving portion 825A of the blade mounting and demounting portion 82 in this preferred embodiment includes the force sensor 832 for detecting the force applied to the moving portion 825A. Accordingly, by adding the force sensor 832 to the existing configuration including the arm 822 and the second base 823, whether or not the boss portion 24A of the blade mount 24 is in contact with the insertion hole 21A1 of the cutting blade 21 can be determined according to the magnitude of the signal detected by the force sensor 832. Accordingly, it can be prevented that the cutting blade 21 may be forcibly mounted or demounted in the condition where the boss portion 24A is in contact with the insertion hole 21A1. As a result, future trouble in the blade mounting and demounting portion 82 or the blade mount 24 can be prevented.

Third Preferred Embodiment

Figure 8:
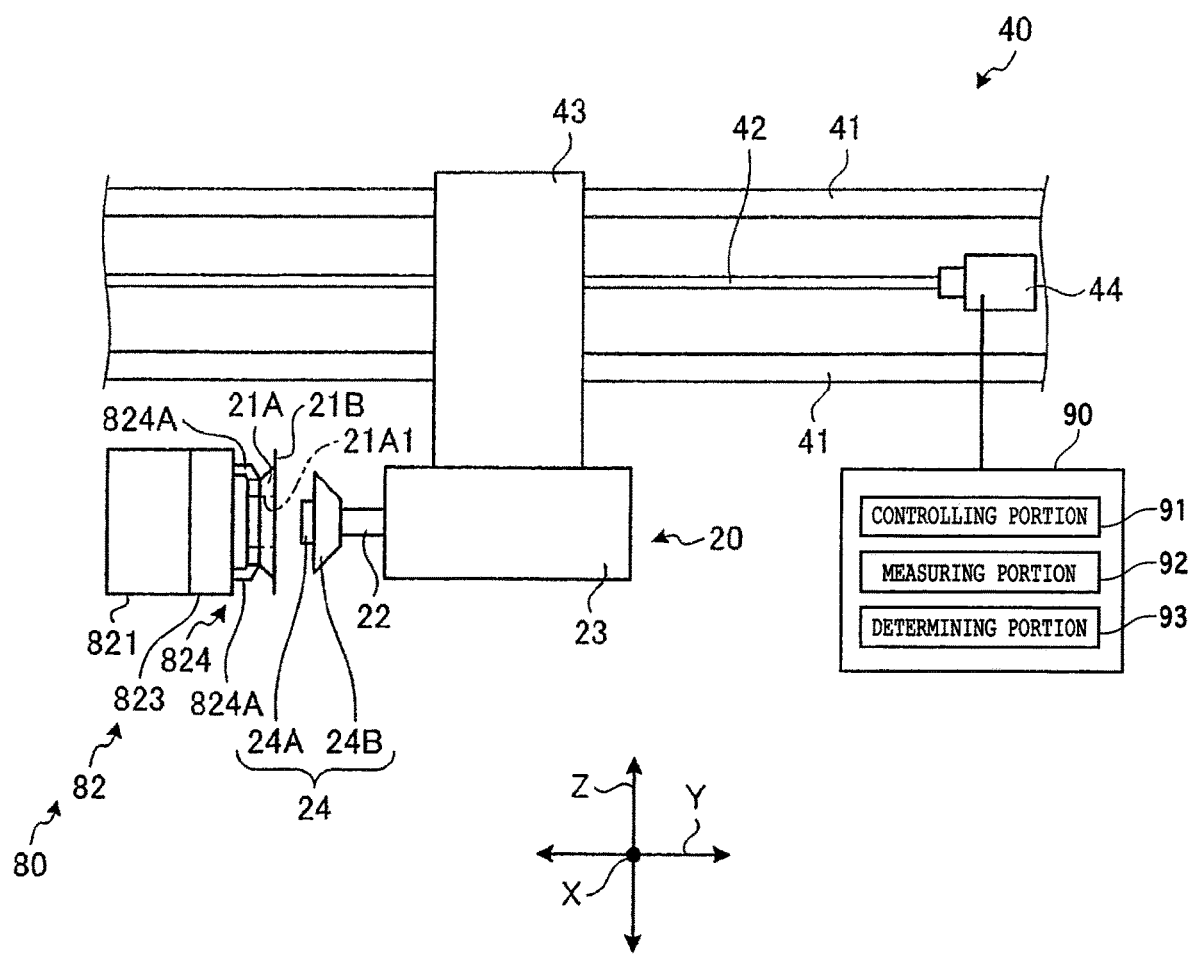
FIG. 8 is a side view illustrating the configuration of indexing means and a blade mounting and demounting portion included in a cutting apparatus according to a third preferred embodiment of the present invention.

A third preferred embodiment of the present invention will now be described with reference to FIG. 8. FIG. 8 is a side view illustrating the configuration of Y moving means (indexing means) 40 and a blade mounting and demounting portion 82 in a cutting apparatus according to the third preferred embodiment. In the third preferred embodiment, the Y moving means 40 is used to move the cutting unit 20 toward or away from the blade mounting and demounting portion 82 in the Y-axis direction, thereby mounting the cutting blade 21 to the blade mount 24 or demounting the cutting blade 21 from the blade mount 24. In this preferred embodiment, the same parts as those in the first preferred embodiment are denoted by the same reference numerals.

As similar to the first preferred embodiment, the Y moving means 40 includes a motor 44 for moving the cutting unit 20 in the Y-axis direction relative to the chuck table 10 (see FIG. 1). In this preferred embodiment, the measuring portion 92 in the control unit 90 functions to measure a signal indicating a force applied to the motor 44 of the Y moving means 40 in mounting the cutting blade 21 to the boss portion 24A of the blade mount 24 or demounting the cutting blade 21 from the boss portion 24A. More specifically, as similar to the first preferred embodiment, the torque (%) or torque value (including the deviation or standard deviation thereof) of the motor 44 may be used as the force applied to the motor 44. Alternatively, at least one of the current value, voltage value, load, and rotational speed of the motor 44 and the position of the ball screw 42 may be used or the deviation or standard deviation of at least one of these values may also be used.

The determining portion 93 functions to determine the condition of the blade mounting and demounting portion 82 and the blade mount 24 according to the force applied to the motor 44. More specifically, the torque value of the motor 44 is monitored in mounting or demounting the cutting blade 21. When this torque value becomes larger than a predetermined threshold value, the determining portion 93 determines that the boss portion 24A of the blade mount 24 has come into contact with the insertion hole 21A1 of the cutting blade 21, that is, the boss portion 24A is not properly inserted in the insertion hole 21A1. In mounting the cutting blade 21 to the boss portion 24A of the blade mount 24, it is preferable that the motor 44 is controlled to control the amount of movement of the cutting unit 20 in the Y-axis direction so that the end surface 24C of the flange portion 24B of the blade mount 24 does not abut against the cutting blade 21 held by the blade holder 824, and then the boss portion 24A of the blade mount 24 is properly inserted into the insertion hole 21A1 of the cutting blade 21. According to this configuration, the contact between the boss portion 24A of the blade mount 24 and the insertion hole 21A1 of the cutting blade 21 and the contact between the cutting blade 21 and the end surface 24C of the flange portion 24B of the blade mount 24 can be separately determined.

In this preferred embodiment, the control unit 90 includes the measuring portion 92 for measuring a signal indicating a force applied to the Y moving means 40 in mounting the cutting blade 21 to the blade mount 24 or demounting the cutting blade 21 from the blade mount 24 and further includes the determining portion 93 for determining the condition of the blade mount 24 and the blade mounting and demounting portion 82 according to the signal measured above. Accordingly, whether or not the boss portion 24A of the blade mount 24 is in contact with the insertion hole 21A1 of the cutting blade 21 can be determined according to the signal measured. Accordingly, it can be prevented that the cutting blade 21 may be forcibly mounted or demounted in the condition where the boss portion 24A is in contact with the insertion hole 21A1. As a result, future trouble in the blade mounting and demounting portion 82 or the blade mount 24 can be prevented.

The third preferred embodiment may be modified in the following manner. As similar to the first or second preferred embodiment, the blade mounting and demounting portion 82 includes the moving portion 825 (the motor 827) or the moving portion 825A (the air cylinder 830) for moving the second base 823 and the blade holder 824 in the Y-axis direction (in the axial direction of the boss portion 24A). Accordingly, in this modification, the blade holder 824 is moved in the Y-axis direction to mount or demount the cutting blade 21 without operating the Y moving means 40, that is, without operating the motor 44. In this case, the measuring portion 92 measures a signal indicating a force applied to the motor 44 in mounting or demounting the cutting blade 21.

Fourth Preferred Embodiment

Figure 9:
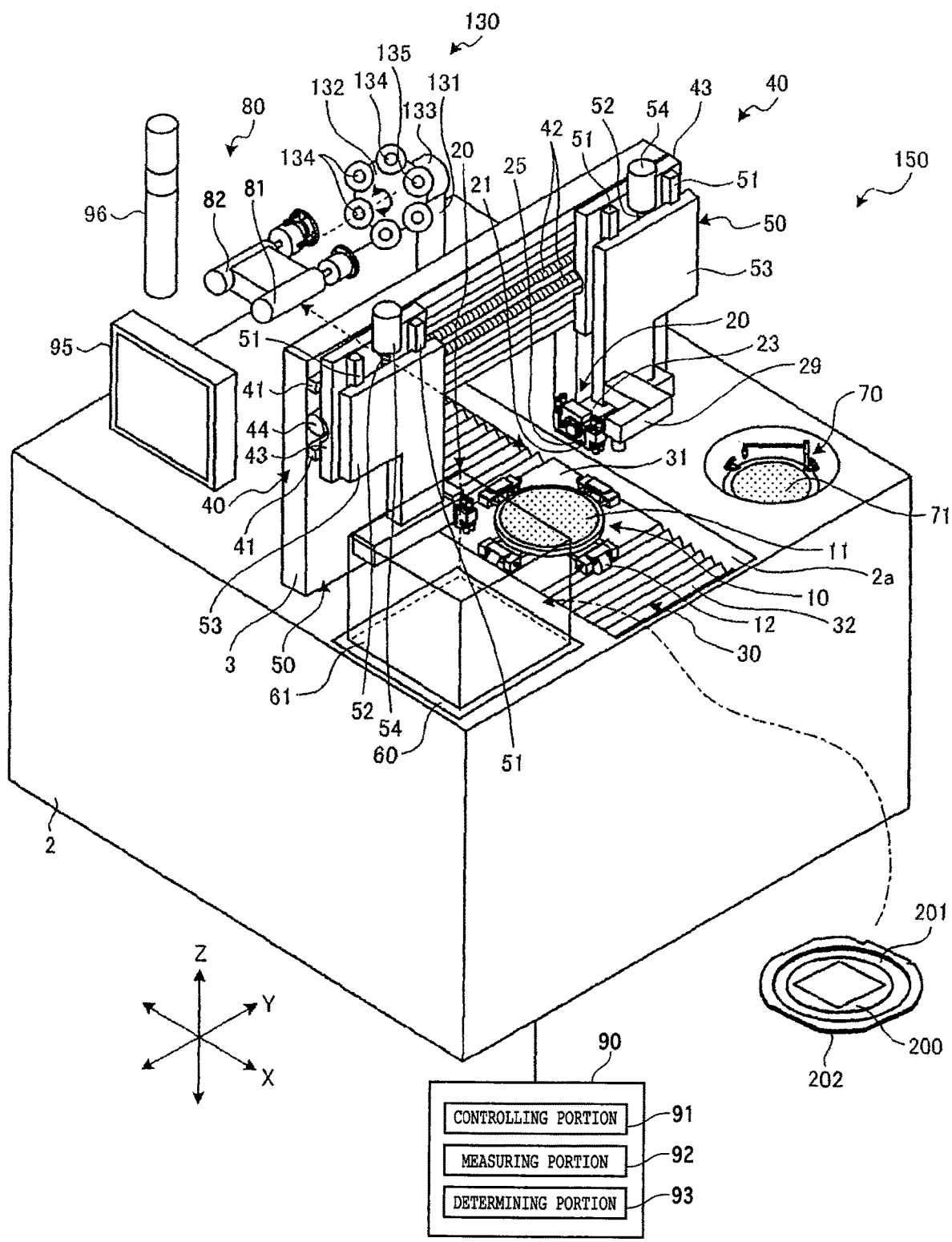
FIG. 9 is a perspective view illustrating the configuration of a cutting apparatus according to a fourth preferred embodiment of the present invention.

A fourth preferred embodiment of the present invention will now be described with reference to FIG. 9. FIG. 9 is a perspective view illustrating the configuration of a cutting apparatus 150 according to the fourth preferred embodiment. In the fourth preferred embodiment, the cutting apparatus 150 includes a blade stocker 130 for storing a plurality of cutting blades 21 including new blades to be mounted to the cutting unit 20 and old blades demounted from the cutting unit 20. The blade stocker 130 is provided in the vicinity of the standby position of a blade changing unit 80 similar to that in the first preferred embodiment. Actually, a pair of blade changing units 80 and a pair of blade stockers 130 are provided so as to respectively corresponding to a pair of cutting units 20 similar to those in the first preferred embodiment. In FIG. 9, one of the blade changing units 80 and one of the blade stockers 130 are illustrated for convenience of illustration. In this preferred embodiment, the same parts as those in the first preferred embodiment are denoted by the same reference numerals.

As illustrated in FIG. 9, the blade stocker 130 includes a support column 131 provided on the upper surface of the base housing 2, a rotating member 133 mounted at the upper end of the support column 131, and a disk-shaped member 131 rotatably supported to the rotating member 133. A plurality of new blade storing portions 134 for storing new cutting blades 21 to be mounted to the cutting unit 20 and a plurality of old blade storing portions 135 for storing old cutting blades 21 demounted from the cutting unit 20 are provided on the front side of the disk-shaped member 132 so as to be arranged at given intervals along the outer circumference of the disk-shaped member 132. That is, the new blade storing portions 134 and the old blade storing portions 135 are located on the same circle. The new cutting blades 21 to be stored in the new blade storing portions 134 include cutting blades of the same kind and/or different kinds.

The rotating member 133 has a motor (not illustrated) for rotating the disk-shaped member 132. The motor has a rotating shaft connected to the back side of the disk-shaped member 132 at its center. By operating the motor of the rotating member 133, the disk-shaped member 132 can be intermittently rotated about the axis of the rotating shaft of the motor. By this intermittent rotation of the disk-shaped member 132, the new blade storing portions 134 and the old blade storing portions 135 are intermittently rotated about the center of the disk-shaped member 132 in such a manner that these storing portions 134 and 135 are selectively opposed to the blade mounting and demounting portion 82 of the blade changing unit 80.

According to this preferred embodiment, the cutting apparatus 150 includes the blade stocker 130 for storing a plurality of cutting blades 21, so that the old cutting blade 21 can be easily replaced by the new cutting blade 21 at regular intervals or in emergency.

The present invention is not limited to the details of the above described preferred embodiments. The scope of the invention is defined by the appended claims and all changes and modifications as fall within the equivalence of the scope of the claims are therefore to be embraced by the invention.

What is claimed is:
1. A cutting apparatus comprising:
a chuck table for holding a workpiece;
a cutting unit having a spindle, a blade mount fixed to the spindle at a first end thereof, and a cutting blade detachably mounted on the blade mount for cutting the workpiece held on the chuck table, the cutting blade being composed of an annular support base having a central insertion hole and an annular cutting edge provided on the outer circumference of the support base;
a blade changing unit that replaces the cutting blade with a new cutting blade by demounting the cutting blade, which is an old blade, from the blade mount and then mounting the new cutting blade to the blade mount; and a control unit controlling the cutting unit and the blade changing unit, wherein the blade mount includes:
- a boss portion adapted to be inserted through the insertion hole of the support base of the cutting blade and extending in the axial direction of the spindle, and
- a flange portion formed at one end of the boss portion so as to project radially outward from the outer circumference of the boss portion, the flange portion having an end surface adapted to abut against the support base of the cutting blade, the blade changing unit includes:
- a holding portion for detachably holding the support base of the cutting blade, and
- a moving portion for moving the holding portion in the axial direction of the boss portion toward and away from the blade mount in a condition where the insertion hole of the support base is opposed to the boss portion, thereby mounting the new cutting blade to the boss portion or demounting the cutting blade from the boss portion, and the control unit includes:
- a measurer that measures a signal indicating a force applied to the moving portion of the blade changing unit in mounting the new cutting blade to the blade mount or demounting the cutting blade from the blade mount, and
- a determiner that determines the condition of the blade changing unit and the blade mount according to the signal measured by the measurer.

2. The cutting apparatus according to claim 1, wherein the moving portion includes a sensor for detecting a force applied to the moving portion.

3. The cutting apparatus according to claim 1, wherein the moving portion includes a motor, and
the signal includes at least one of a current, voltage, load, speed, torque, deviation, and position of the motor.

4. A cutting apparatus comprising:

a chuck table for holding a workpiece;

a cutting unit having a spindle, a blade mount fixed to the spindle at a first end thereof, and a cutting blade detachably mounted on the blade mount for cutting the workpiece held on the chuck table, the cutting blade being composed of an annular support base having a central insertion hole and an annular cutting edge provided on the outer circumference of the support base;

indexing means rotatably supporting the spindle so that the spindle is movable back and forth in its axial direction;

a blade changing unit that replaces the cutting blade with a new cutting blade by demounting the cutting blade, which is an old blade, from the blade mount and then mounting the new cutting blade to the blade mount; and a control unit controlling the cutting unit, the indexing means, and the blade changing unit, wherein the blade mount includes:
- a boss portion adapted to be inserted through the insertion hole of the support base of the cutting blade and extending in the axial direction of the spindle, and
- a flange portion formed at one end of the boss portion so as to project radially outward from the outer circumference of the boss portion, the flange portion having an end surface adapted to abut against the support base of the cutting blade, the blade changing unit includes:
- a holding portion for detachably holding the support base of the cutting blade, and
- a moving portion for moving the holding portion in the axial direction of the boss portion toward and away from the blade mount in a condition where the insertion hole of the support base is opposed to the boss portion, thereby mounting the new cutting blade to the boss portion or demounting the cutting blade from the boss portion, and the control unit includes:
- a measurer that measures a signal indicating a force applied to the indexing means in mounting the new cutting blade to the blade mount or demounting the cutting blade from the blade mount, and
- a determiner that determines the condition of the blade changing unit and the blade mount according to the signal measured by the measurer.

5. The cutting apparatus according to claim 4, wherein the indexing means includes a motor, and
the signal includes at least one of a current, voltage, load, speed, torque, deviation, and position of the motor.

* * * * *